United States Patent
Wu et al.

(10) Patent No.: US 8,472,185 B2
(45) Date of Patent: Jun. 25, 2013

(54) PACKAGE AND ASSEMBLY HAVING A COMPUTER HOUSING, AN ARTICLE, AND THE PACKAGE

(75) Inventors: Meng-Hsun Wu, Hsichih District (TW); Fu-Jen Yang, Hsichih District (TW); Yang-Chieh Ma, Hsichih District (TW)

(73) Assignee: Wistron Corporation, New Taipei (TW)

( * ) Notice: Subject to any disclaimer, the term of this patent is extended or adjusted under 35 U.S.C. 154(b) by 164 days.

(21) Appl. No.: 13/088,894

(22) Filed: Apr. 18, 2011

(65) Prior Publication Data

US 2011/0255241 A1 Oct. 20, 2011

(30) Foreign Application Priority Data

Apr. 19, 2010 (TW) ................................ 99112166 A

(51) Int. Cl.
*H05K 7/20* (2006.01)
*A47B 81/00* (2006.01)
*H05K 5/02* (2006.01)

(52) U.S. Cl.
USPC ............ 361/679.54; 361/679.47; 361/679.02; 361/695; 361/697; 361/715; 315/223.1; 315/223.2; 315/244

(58) Field of Classification Search
USPC ............. 361/679.02, 679.32, 679.33, 679.37, 361/679.39, 679.46–679.54, 690–697, 715, 361/722–728; 165/80.3, 104.33, 121–126, 165/185; 312/223.1, 223.2, 236, 244; 454/184; 211/41.17
See application file for complete search history.

(56) References Cited

U.S. PATENT DOCUMENTS

| | | | | |
|---|---|---|---|---|
| 5,668,696 | A * | 9/1997 | Schmitt | 361/679.31 |
| 6,272,005 | B1 * | 8/2001 | Jensen et al. | 361/679.41 |
| 7,354,293 | B2 * | 4/2008 | Liang | 439/372 |
| 7,391,957 | B2 | 6/2008 | Behl | |
| 7,586,748 | B2 * | 9/2009 | Chen | 361/727 |
| 7,672,127 | B2 * | 3/2010 | Hayashi | 361/695 |
| 7,719,836 | B2 * | 5/2010 | Franz et al. | 361/695 |
| 2003/0198016 | A1 * | 10/2003 | Wobig et al. | 361/687 |
| 2004/0256334 | A1 * | 12/2004 | Chen | 211/41.17 |
| 2006/0056150 | A1 * | 3/2006 | Behl et al. | 361/687 |
| 2008/0062637 | A1 * | 3/2008 | Chang | 361/687 |
| 2008/0180918 | A1 * | 7/2008 | Baker et al. | 361/727 |
| 2009/0279246 | A1 * | 11/2009 | Nguyen et al. | 361/679.34 |
| 2012/0097363 | A1 * | 4/2012 | Chou | 165/47 |

FOREIGN PATENT DOCUMENTS

TW M322118 11/2007
TW M331731 5/2008

OTHER PUBLICATIONS

Taiwanese Office Action from Taiwan Application No. 099112166 mailed Mar. 25, 2013 (English Translation).

* cited by examiner

*Primary Examiner* — Michail V Datskovskiy
(74) *Attorney, Agent, or Firm* — Merchant & Gould P.C.

(57) ABSTRACT

An assembly includes an article, and a computer housing including left and right sidewalls cooperatively defining an accommodating space and an opening for communicating the accommodating space with an external environment, and a positioning member provided on one of the sidewalls. Each sidewall includes a slide rail. A package is mounted removably in the accommodating space via the opening, is connected slidably to the slide rails of the sidewalls, and is positioned within the accommodating space through the positioning member. The package includes two interconnected cover parts cooperatively defining a receiving space for receiving the article and a communicating hole for communicating the receiving space with the external environment, and a handgrip to mount removably the package in the accommodating space. Each cover part includes a stop member abutting against the article to prevent escape of the article from the receiving space via the communicating hole.

19 Claims, 21 Drawing Sheets

PACKAGE AND ASSEMBLY HAVING A COMPUTER HOUSING, AN ARTICLE, AND THE PACKAGE

CROSS-REFERENCE TO RELATED APPLICATION

This application claims priority of Taiwanese Application No. 099112166, filed on Apr. 19, 2010.

BACKGROUND OF THE INVENTION

1. Field of the Invention

This invention relates to a package, more particularly to a package for receiving an article and for mounting removably within a computer housing, and an assembly having the computer housing, the article, and the package.

2. Description of the Related Art

A computer system is usually provided with a heat sink to dissipate heat inside the system. The packaging cost and transport fee of the heat sink form a specific portion of the overall manufacturing costs. Currently, there are two methods for packaging the heat sink: single packaging and industrial packaging. In the single packaging method, heat sinks are first packed individually in a carton, after which they are put in a packing box for transport. Although this method allows the heat sinks to be individually sold or delivered, the packaging cost and transport fee thereof are high. In the industrial packaging method, the heat sinks are directly placed on a tray, after which the tray is put on a packing box for transport. However, in this case, the heat sinks can only be delivered to the factory for assembly, and cannot be individually sold or delivered.

Therefore, the area of improvement that the present invention focuses on is that related to realizing a structural design which can overcome the disadvantages of the single and industrial packaging methods.

SUMMARY OF THE INVENTION

A main object of the present invention is to provide an assembly having a package, a computer housing, and an article. Through the package which can receive the article and which can mount removably within the computer housing, the article and the computer housing can be transported or sold together, so that the costs associated with individual packaging or delivery of the article can be minimized.

Another object of the present invention is to provide a package that is rotatable between a close position to quickly cover an article and an open position to permit easy removal of the article from the package.

The purpose of the present invention and the solution to the conventional technical problems are achieved through employment of the below technical means. According to one aspect of disclosure of the present invention, an assembly comprises an article, a computer housing, and a package. The computer housing includes left and right sidewalls, and a positioning member provided on one of the left and right sidewalls. The left and right sidewalls cooperatively define an accommodating space, and an opening for communicating the accommodating space with an external environment. Each of the left and right sidewalls includes a slide rail extending in a front-rear direction. The package is mounted removably in the accommodating space via the opening, is connected slidably to the slide rails of the left and right sidewalls, and is positioned within the accommodating space through the positioning member. The package includes two interconnected cover parts cooperatively defining a receiving space and a communicating hole for communicating the receiving space with the external environment. The article is disposed in the receiving space. The package further includes a handgrip disposed on a front end thereof to mount removably the package in the accommodating space. Each of the cover parts includes a stop member adjacent to the communicating hole and abutting against the article to prevent escape of the article from the receiving space via the communicating hole.

According to another aspect of this invention, a package for packaging an article comprises two interconnected cover parts cooperatively defining a receiving space for receiving the article, a communicating hole for communicating the receiving space with an external environment, and a handgrip to allow for gripping of the package. Each of the cover parts includes a stop member adjacent to the communicating hole and abutting against the article for preventing escape of the article from the receiving space via the communicating hole.

Through the aforesaid technical means, the advantages and effectiveness of the assembly having the package, the computer housing, and the article according to the present invention reside in the fact that through the package which can hold the article and which can mount removably the article within the accommodating space in the computer housing, the article and the computer housing can be delivered or sold together, so that the costs associated with individual packaging or delivery of the article can be minimized.

BRIEF DESCRIPTION OF THE DRAWINGS

Other features and advantages of the present invention will become apparent in the following detailed description of the embodiments of the invention, with reference to the accompanying drawings, in which.

DETAILED DESCRIPTION OF THE PREFERRED EMBODIMENTS

Figure 1:
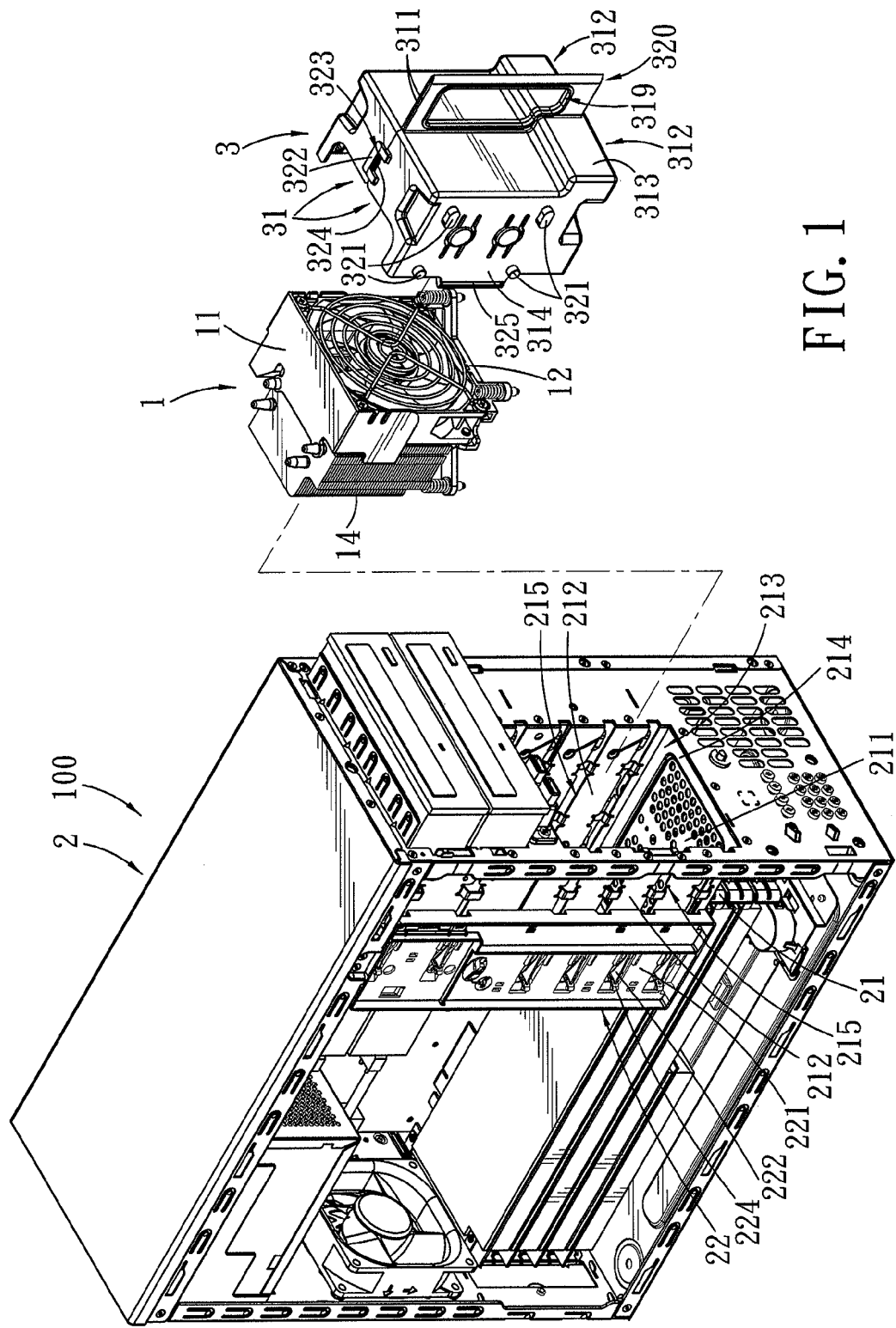
FIG. 1 is an exploded perspective view of a package, a computer housing, and an article of an assembly according to the first embodiment of the present invention.

The above-mentioned and other technical contents, features, and effects of this invention will be clearly presented from the following detailed description of the two embodiments in coordination with the reference drawings. Through description of the concrete implementation method, the technical means employed and the effectiveness to achieve the predetermined purposes of the present invention will be thoroughly and concretely understood. However, the enclosed drawings are used for reference and description only, and are not used for limiting the present invention.

Before this invention is described in detail, it should be noted that, in the following description, similar elements are designated by the same reference numerals.

Referring to FIGS. 1 to 4, an assembly 100 according to the first embodiment of the present invention is shown to comprise an article 1, a computer housing 2, and a package 3. In this embodiment, the article 1 is exemplified as a heat sink.

The computer housing 2 includes a mounting frame 21 disposed on a front end thereof. The mounting frame 21 includes a bottom wall 211, and left and right sidewalls 212 extending upwardly and respectively from left and right ends of the bottom wall 211. The bottom wall 211 and the left and right sidewalls 212 cooperatively define an accommodating space 213, and a front opening 214 for communicating the accommodating space 213 with an external environment. The package 3 is mounted removably in the accommodating space 213 via the front opening 214.

Figure 2:
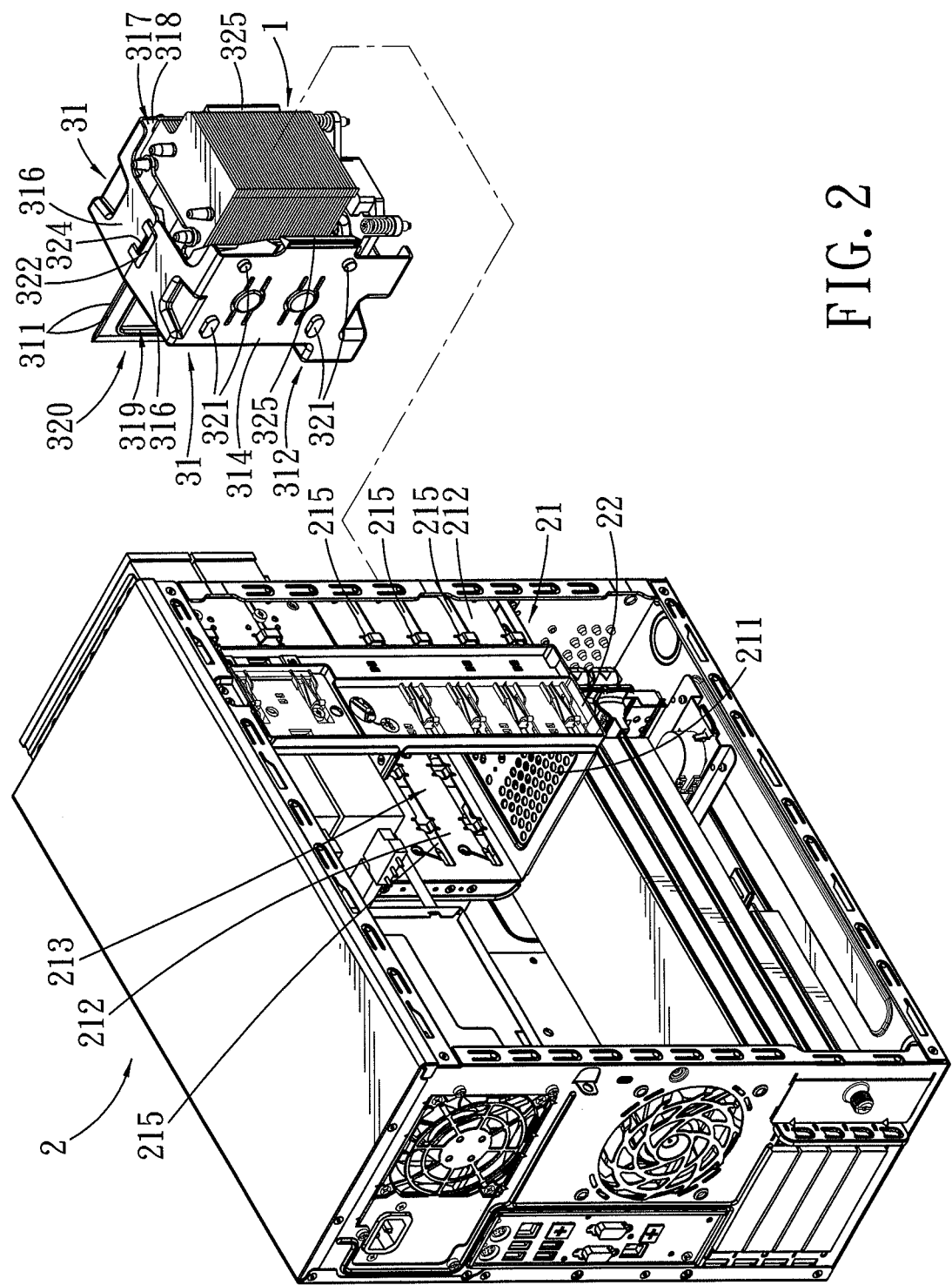
FIG. 2 is a partial exploded perspective view of the assembly of the first embodiment.
Figure 3:
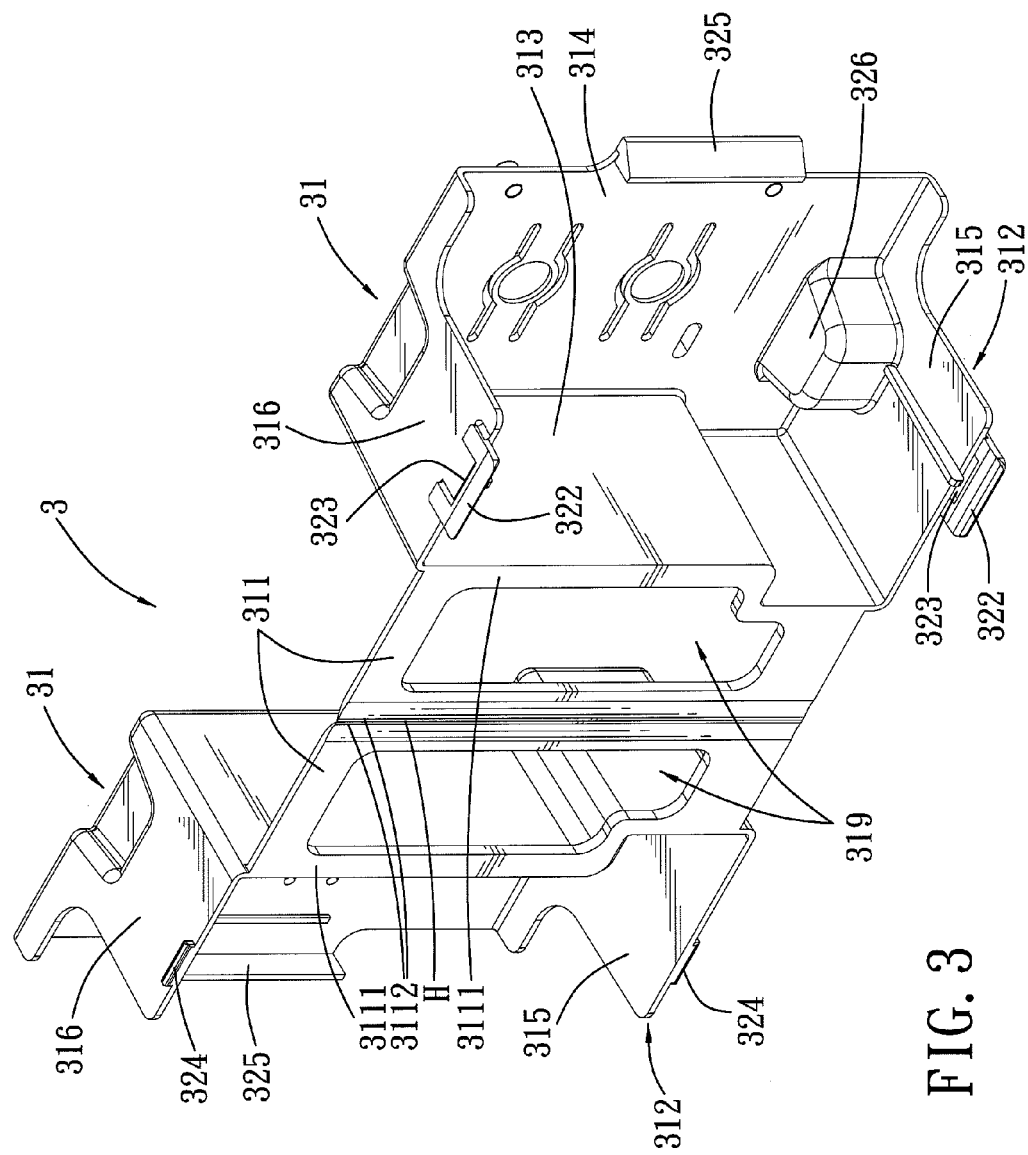
FIG. 3 is a perspective view of the package of the first embodiment in an open position.
Figure 4:
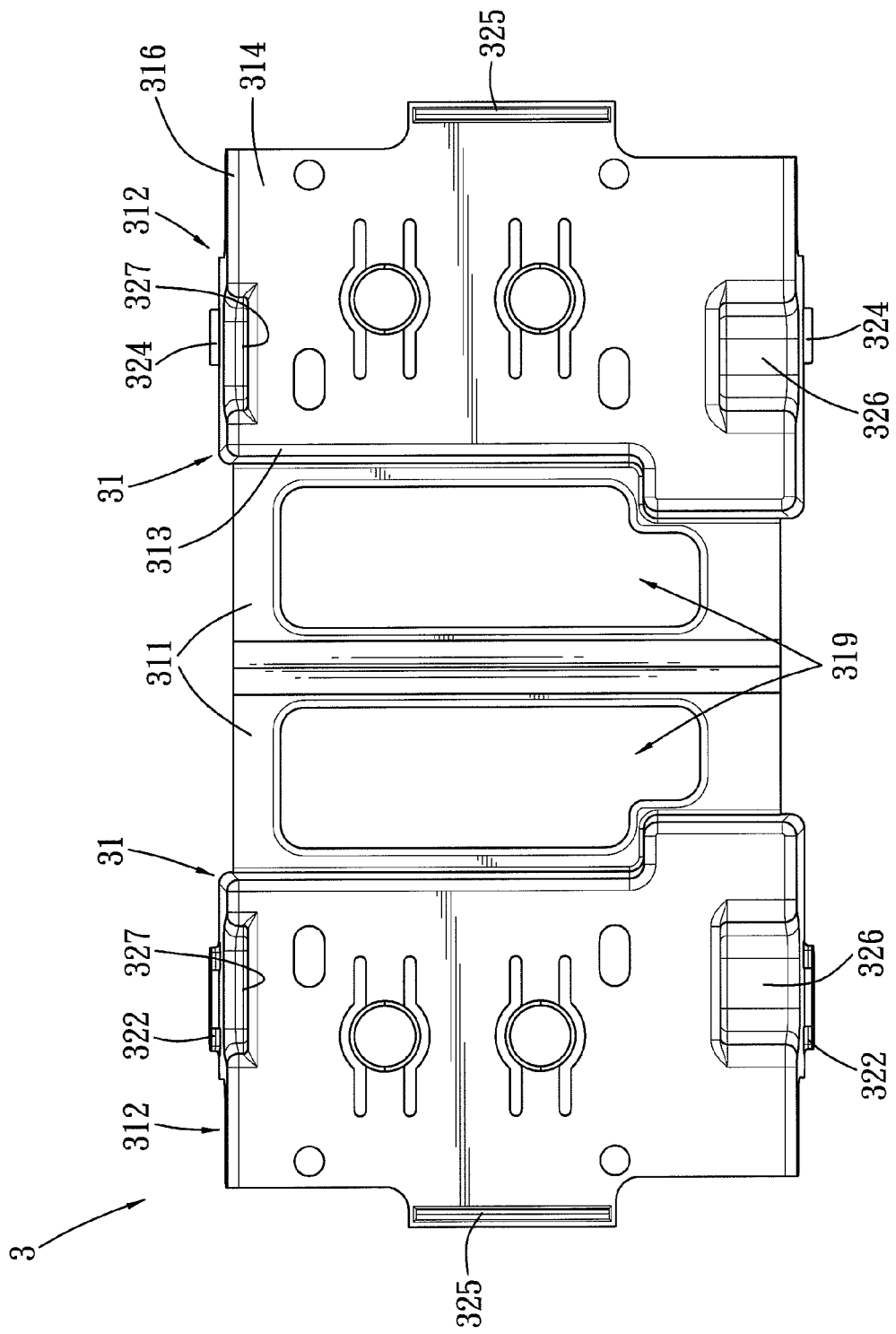
FIG. 4 is a schematic view of the package of FIG. 3.
Figure 5:
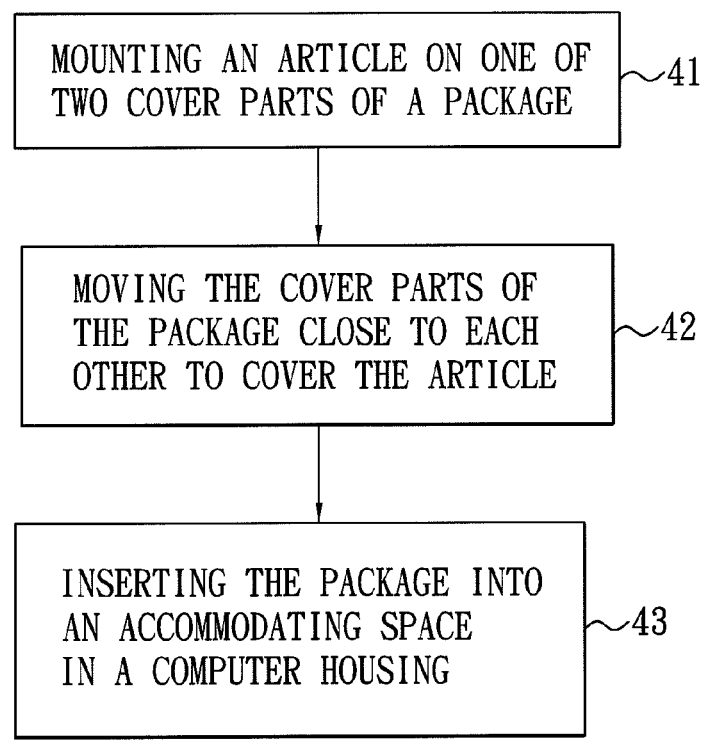
FIG. 5 is a flowchart, illustrating the steps involved in a method of packaging the article.
Figure 6:
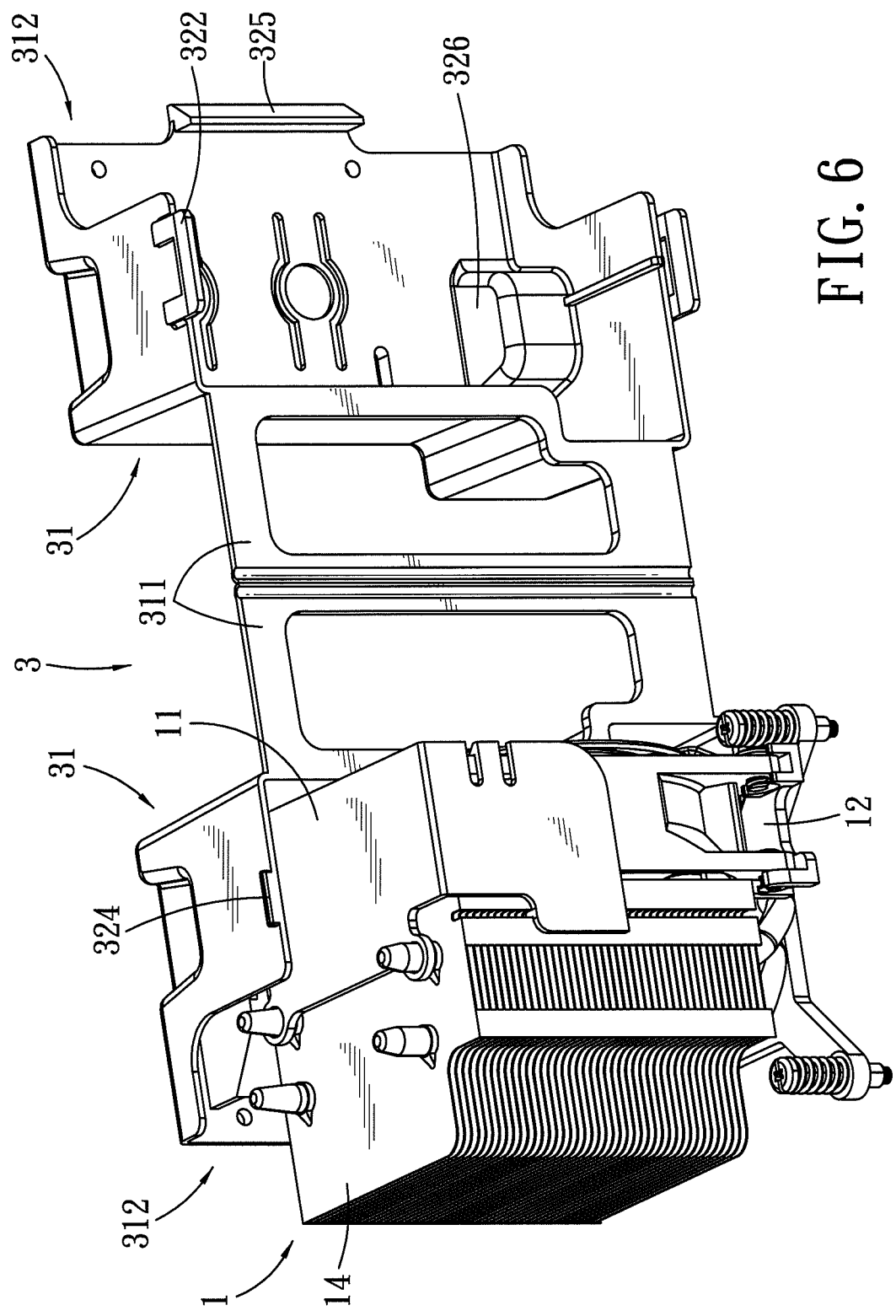
FIG. 6 is a perspective view, illustrating how the article is mounted on one of two cover parts of the package.

With reference to FIGS. 3 and 4, the package 3 is made integrally as a one-piece body from plastic, and includes two cover parts 31 connected to each other in a left-right direction. Each cover part 31 includes a connecting plate 311, and a cover body 312 connected to one end 3111 of the connecting plate 311. The other ends 3112 of the connecting plates 311 of the cover parts 31 are hingely connected to each other through a hinge line (H). Through such a configuration, the cover parts 31 are rotatable relative to each other between an open position (see FIG. 3), where they are moved away from each other, and a cover position (see FIGS. 1 and 2), where they are moved close to each other.

The cover body 312 of each cover part 31 includes a first side plate 313 extending perpendicularly from the end 3111 of the connecting plate 311, a second side plate 314 extending perpendicularly from an outer end of the first side plate 313 away from the connecting plate 311, a bottom plate 315 interconnecting bottom ends of the first and second side plates 313, 314, and a top plate 316 interconnecting top ends of the first and second side plates 313, 314. When the cover parts 31 are disposed in the cover position, as shown in FIG. 2, the first and second side plates 313, 314 and the bottom and top plates 315, 316 of the cover parts 31 cooperatively define a receiving space 317 for receiving the article 1. The second side plates 314 and the bottom and top plates 315, 316 of the cover parts 31 cooperatively define a communicating hole 318 for communicating the receiving space 317 with the external environment and to expose a rear portion of the article 1. Further, the connecting plate 311 of each cover part 31 is formed with a through hole 319. When the cover parts 31 are in the cover position, the connecting plates 311 of the cover parts 31 are juxtaposed, and the through holes 319 in the connecting plates 311 correspond in position to each other, so that the connecting plates 311 of the cover parts 31 cooperatively form a handgrip 320 that is disposed on a front end of the package 3 opposite to the communicating hole 318. The user's fingers can extend through the through holes 319 to grasp the handgrip 320, thereby facilitating insertion or removal of the package 3 into or from the accommodating space 213 (see FIGS. 1 and 2).

In this embodiment, as shown in FIG. 1, each of the left and right sidewalls 212 of the mounting frame 21 includes a plurality of slide rails 215 spaced apart from each other in a top-bottom direction and each extending in a front-rear direction. Each cover body 312 further includes a plurality of pairs of slide projections 321 projecting from an outer face of the second side plate 314 and spaced apart from each other in a top-bottom direction. The slide projections 321 of each pair are spaced apart from each other in a front-rear direction. Each pair of the slide projections 321 is slidable along the respective slide rail 215. Through such a configuration, the user can smoothly insert or remove the package 3 into or from the accommodating space 213.

With reference to FIGS. 2 to 4, the bottom and top plates 315, 316 of the cover body 312 of one of the cover parts 31 are respectively provided with a flexible member, in the form of a spring plate 322, on an outer face thereof. The spring plate 322 is formed with an engaging groove 323. The bottom and top plates 315, 316 of the cover body 312 of the other cover part 31 are respectively provided with an engaging protrusion 324 projecting from an outer face thereof and engageable with the respective engaging groove 323. Through engagement of the engaging protrusions 324 with the respective engaging grooves 323, the cover parts 31 can be secured to each other in the cover position. In contrast, the user can pull the spring plates 322 to disengage the engaging grooves 323 from the engaging pieces 324, so that the cover parts 31 can be rotated away from each other to the open position.

To stably secure the article 1 within the receiving space 317 in the package 3, each cover part 31 further includes a hook-shaped stop member 325 provided on an outer edge of the second side plate 314 of a respective cover part 31 and adjacent to the communicating hole 318. When the cover parts 31 are in the cover position, the stop members 325 of the cover parts 31 are hooked respectively against two opposite lateral sides of the article 1, thereby preventing the article 1 from moving out of the receiving space 317 via the communicating hole 318. Preferably, as shown in FIG. 4, each cover part 31 further includes a lower abutment portion 326 projecting from an inner face of the bottom plate 315 thereof for abutment against a bottom end of the article 1, and an upper abutment portion 327 projecting from an inner face of the top plate 316 thereof for abutment against a top end of the article 1. Through such a configuration, the article 1 can be prevented from upward and downward rocking within the receiving space 317.

Referring to FIGS. 5 to 8, a method for packaging the article 1 using the aforesaid package 3 of the present invention includes steps 41 to 43.

In step 41, the article 1 is first mounted on the cover body 312 of one of the cover parts 31 which are rotated in the open position at this time. Through abutment of the upper and lower abutment portions 327, 326 of said one of the cover parts 31 with a top cover 11 and a base seat 12 of the article 1, respectively, the article 1 can be retained within the cover body 312 of said one of the cover parts 31.

Figure 7:
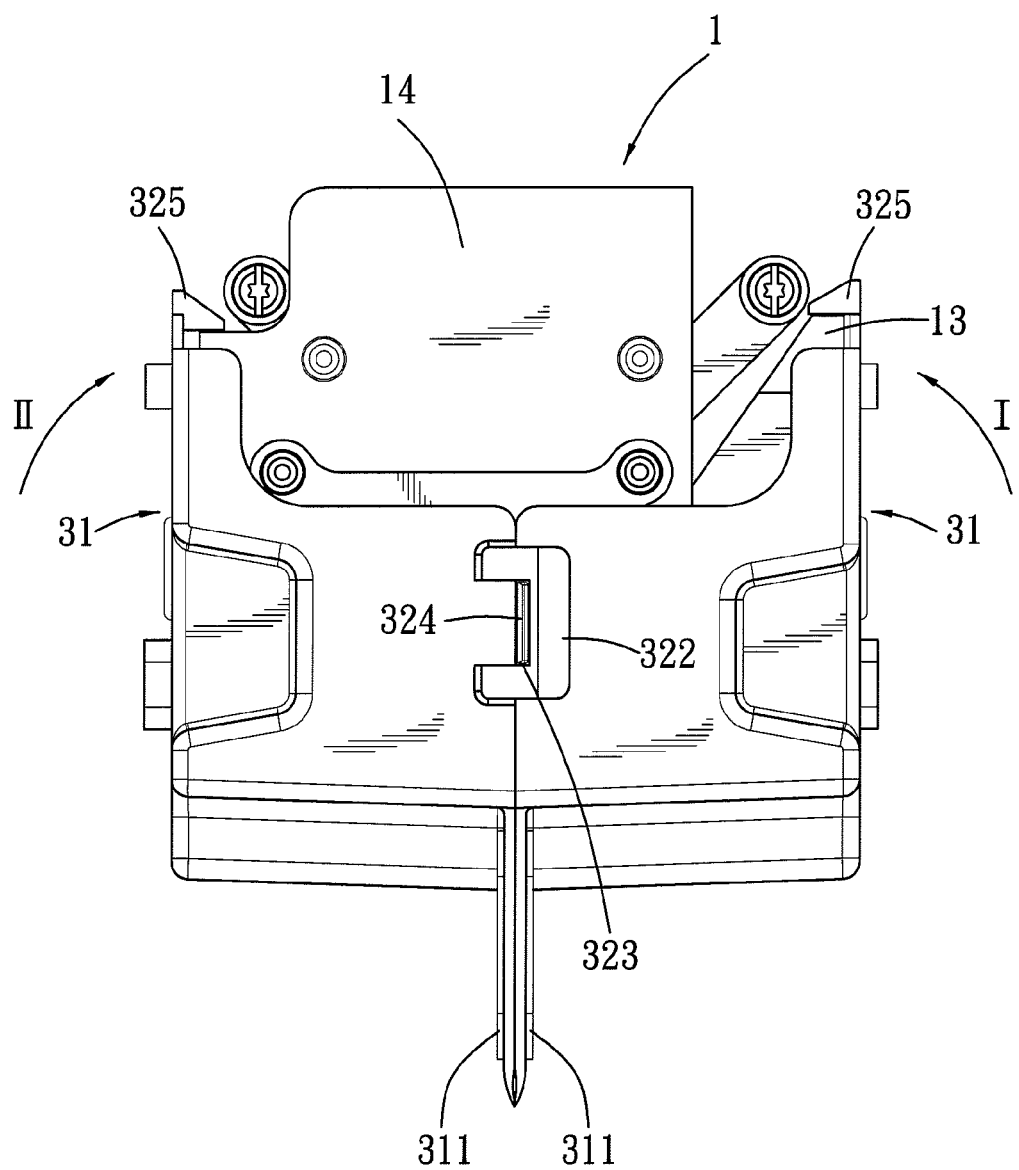
FIG. 7 is a schematic top view, illustrating the cover parts of the package retaining therebetween the article.
Figure 8:
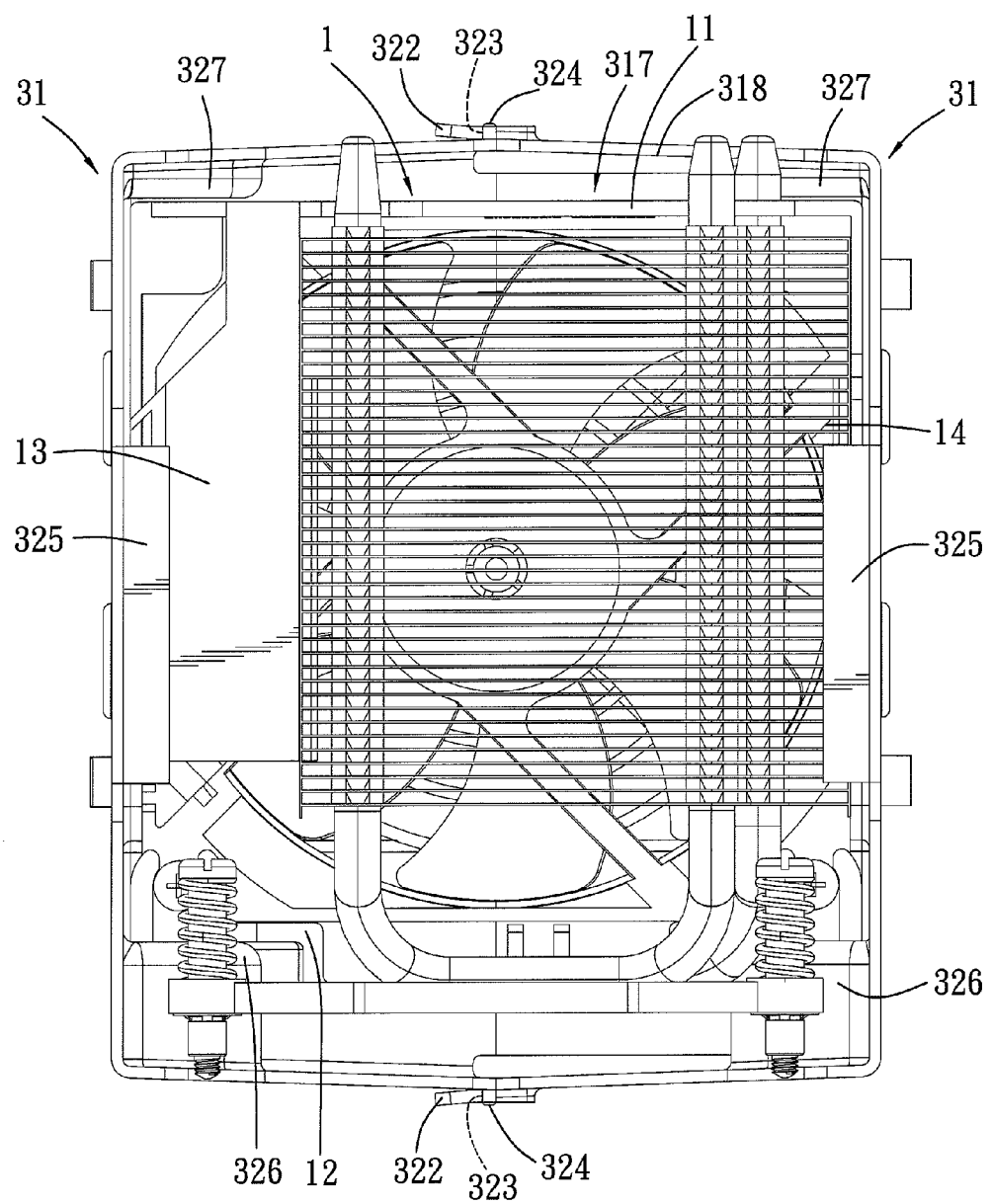
FIG. 8 is a schematic view, illustrating how upper and lower abutment portions of the package abut against upper and lower sides of the article.
Figure 9:
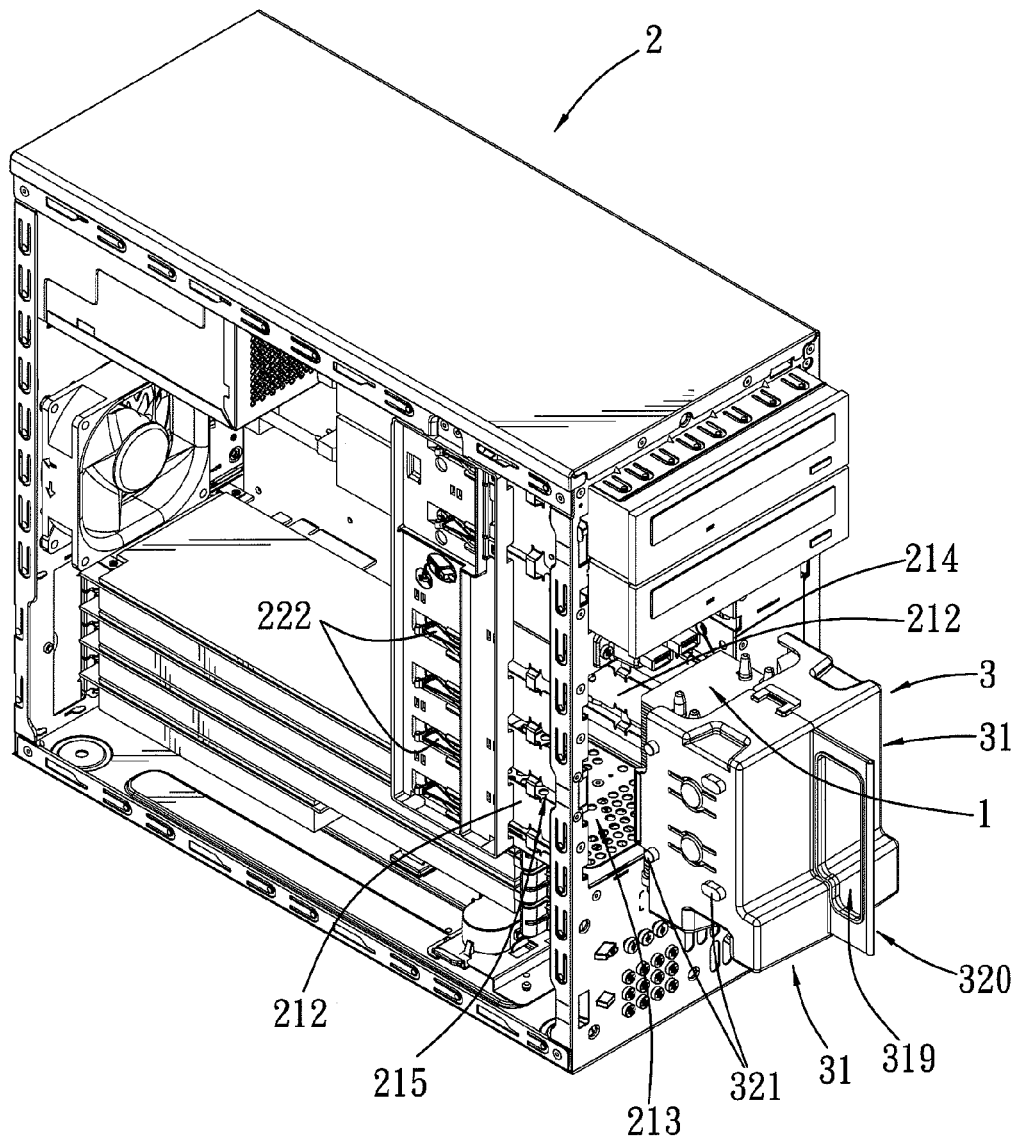
FIG. 9 is a perspective view of the first embodiment, illustrating how the package with the retained article can be disposed within the computer housing.

In step 42, the cover parts 31 are rotated close to each other to cover the article 1 therebetween. Because the connecting plates 311 of the cover parts 31 are hingely connected to each other, the cover parts 31 are rotatable from the open position shown in FIG. 6 to the cover position along the direction of arrows (I, II), respectively, as shown in FIG. 7. The engaging grooves 323 are then engaged to the respective engaging protrusions 324 to secure the cover parts 31 to each other at the cover position, thereby retaining the article 1 between the cover parts 31. At this time, the upper and lower abutment portions 327, 326 of the cover parts 31 abut respectively against the top cover 11 and the base seat 12 of the article 1, and the stop members 325 are hooked respectively against an air duct 13 and a heat-dissipating fin set 14 of the article 1. Hence, the article 1 can be secured within the receiving space 317 and can be prevented from moving out of the receiving space 317 via the communicating hole 318.

Figure 10:
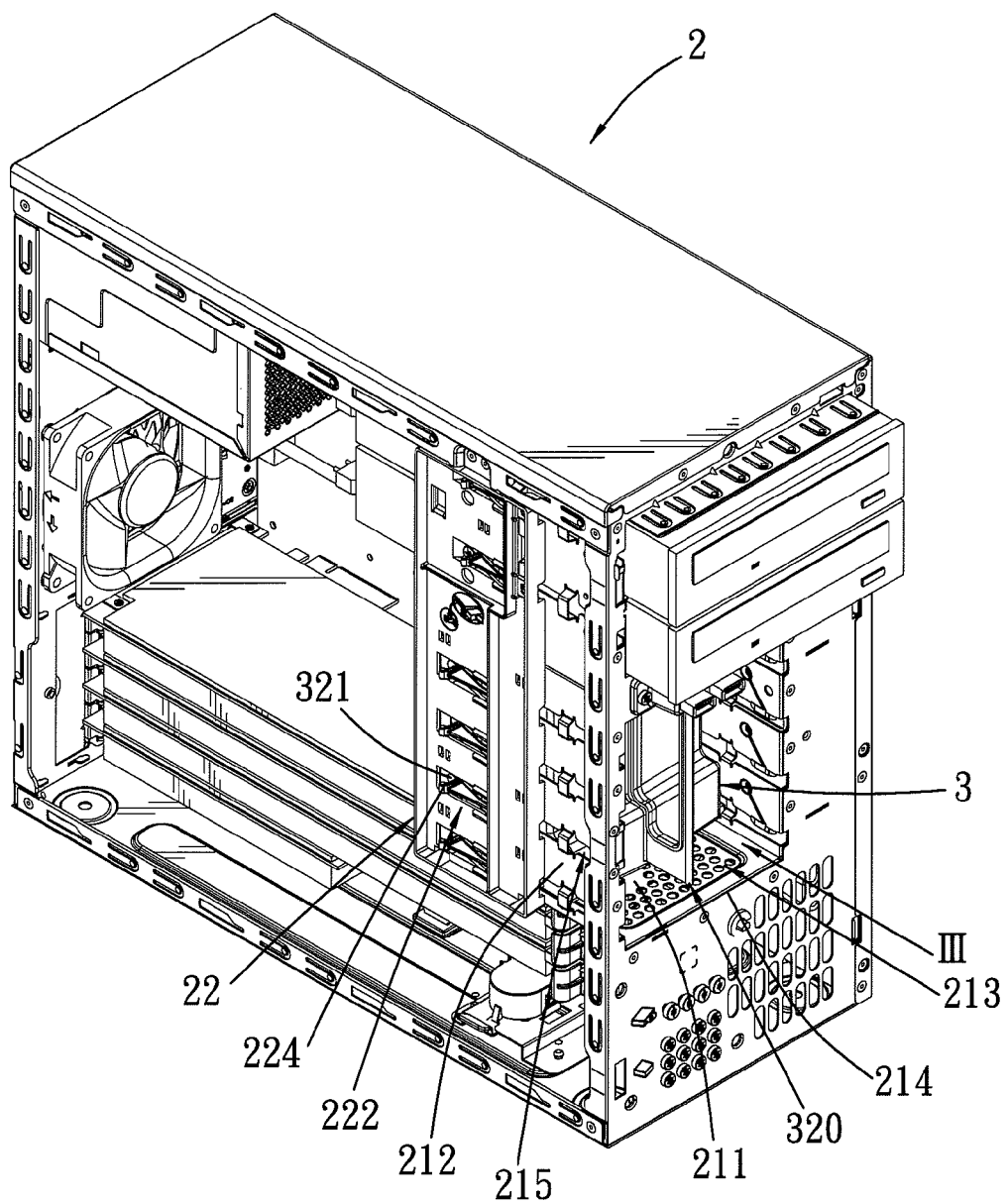
FIG. 10 is a view similar to FIG. 9, but illustrating the package with the retained article being disposed within the computer housing.
Figure 11:
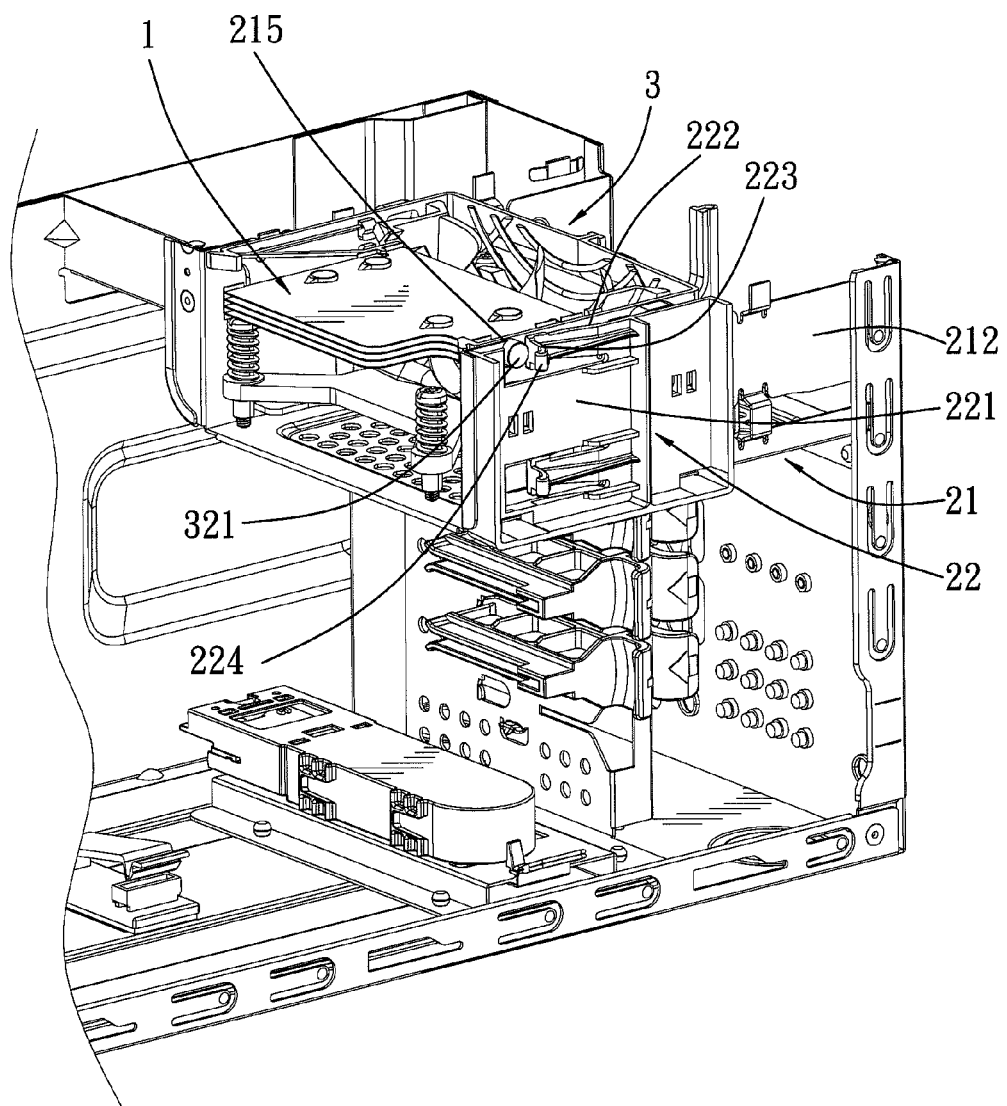
FIG. 11 is a fragmentary perspective view of the first embodiment, illustrating a retaining portion of a positioning member abutting against a front end of a slide projection.

In step 43, with reference to FIGS. 5 and 9 to 11, the package 3 with the retained article 1 is first horizontally aligned with the front opening 214 in the mounting frame 21 of the computer housing 2, and is then inserted into the accommodating space 213 via the front opening 214 along the direction of an arrow (III) shown in FIG. 10. Through the slidable engagement of the slide projections 321 with the respective slide rails 215, the user can smoothly push the package 3 into the accommodating space 213. In this embodiment, the computer housing 2 further includes a quick release mechanism 22 provided on the mounting frame 21. The quick release mechanism 22 includes a plate member 221 mounted to an outer side of the left sidewall 212, and a plurality of positioning members 222 provided on the plate member 221 and each extending into a respective slide rail 215. Each positioning member 222 is configured as a flexible arm, and includes a retaining portion 223 that is proximate to a rear end of the respective slide rail 215 and that is releasably pressable against a corresponding slide projection 321, and a lever portion 224 extending outwardly from the retaining portion 223. When the pairs of the slide projections 321 of the cover parts 31 slide along the respective slide rails 215 until the rear ones of the slide projections 321 of a left one of the cover parts 31 contact the respective retaining portions 223 of the positioning members 222, the rear slide projections 321 of the left cover part 31 are moved continuously to push the retaining portions 223 of the respective positioning members 222 outwardly. As the slide projections 321 of the cover parts 31 slide continuously along the respective slide rails 215, with the rear slide projections 321 of the left cover part 31 moving past the respective retaining portions 223, and abut against the rear ends of the respective slide rails 215, the package 3 is stopped from moving rearwardly. Simultaneously, the retaining portions 223 are moved to their original positions through the restoring forces of the positioning members 222 so as to press against front ends of the respective rear slide projections 321 of the left cover part 31, thereby positioning and preventing forward and rearward movement of the package 3 within the accommodating space 213.

Figure 12:
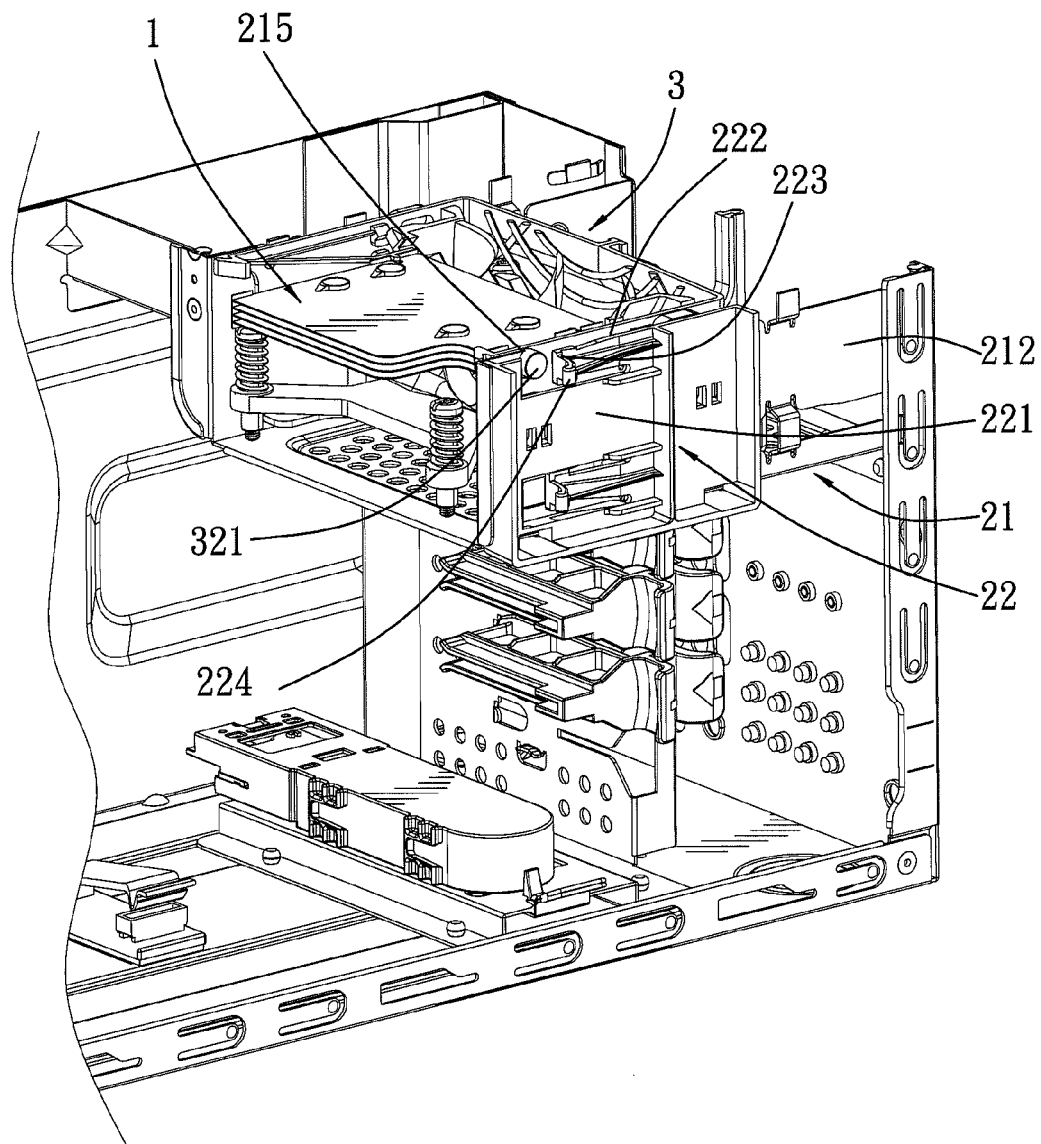
FIG. 12 is a view similar to FIG. 11, but illustrating the retaining portion and the slide projection being moved away from each other when a pull portion of the positioning member is pulled outwardly.
Figure 13:
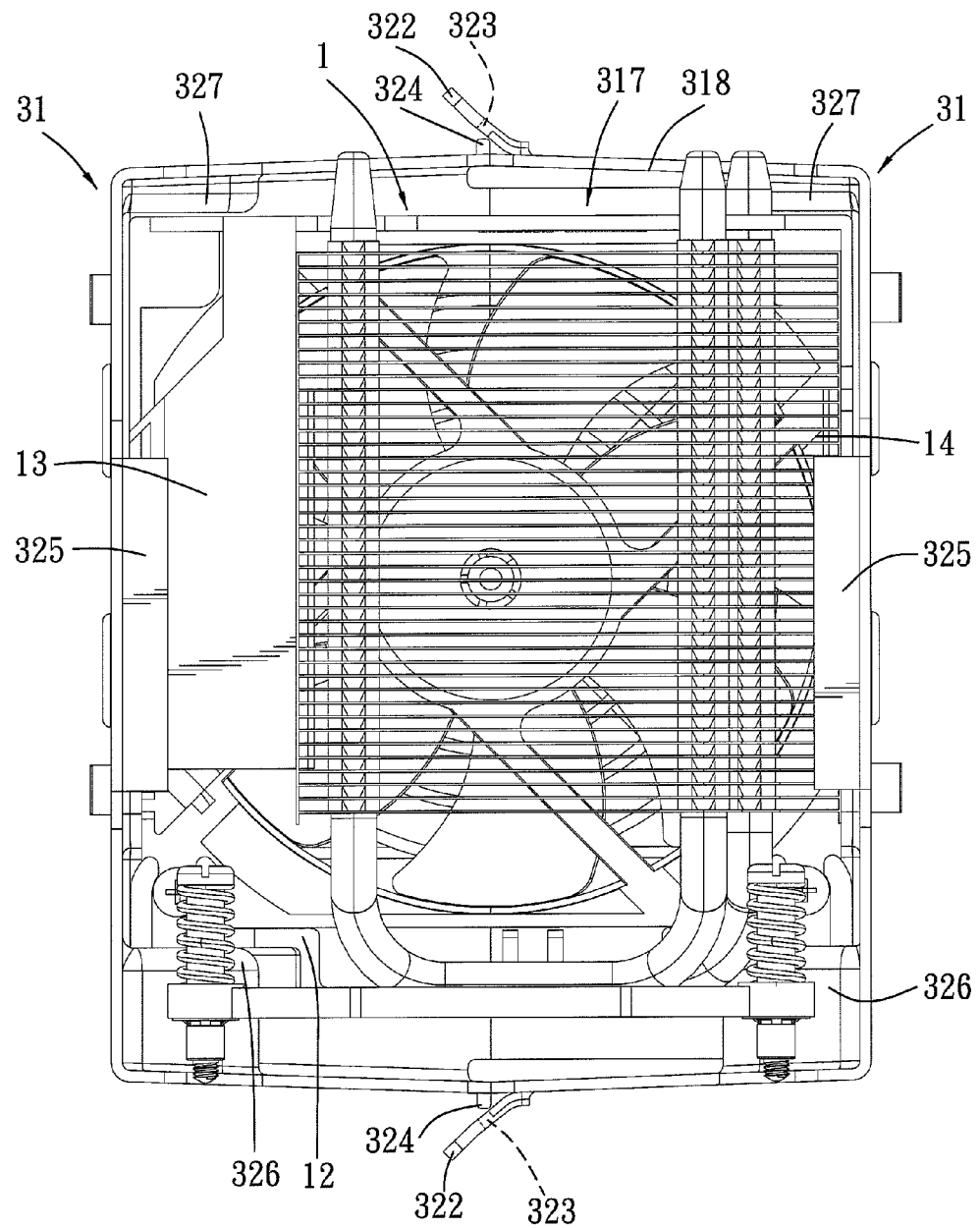
FIG. 13 is a view similar to FIG. 8, but illustrating a spring plate being pulled outwardly to move an engaging groove away from an engaging piece.
Figure 14:
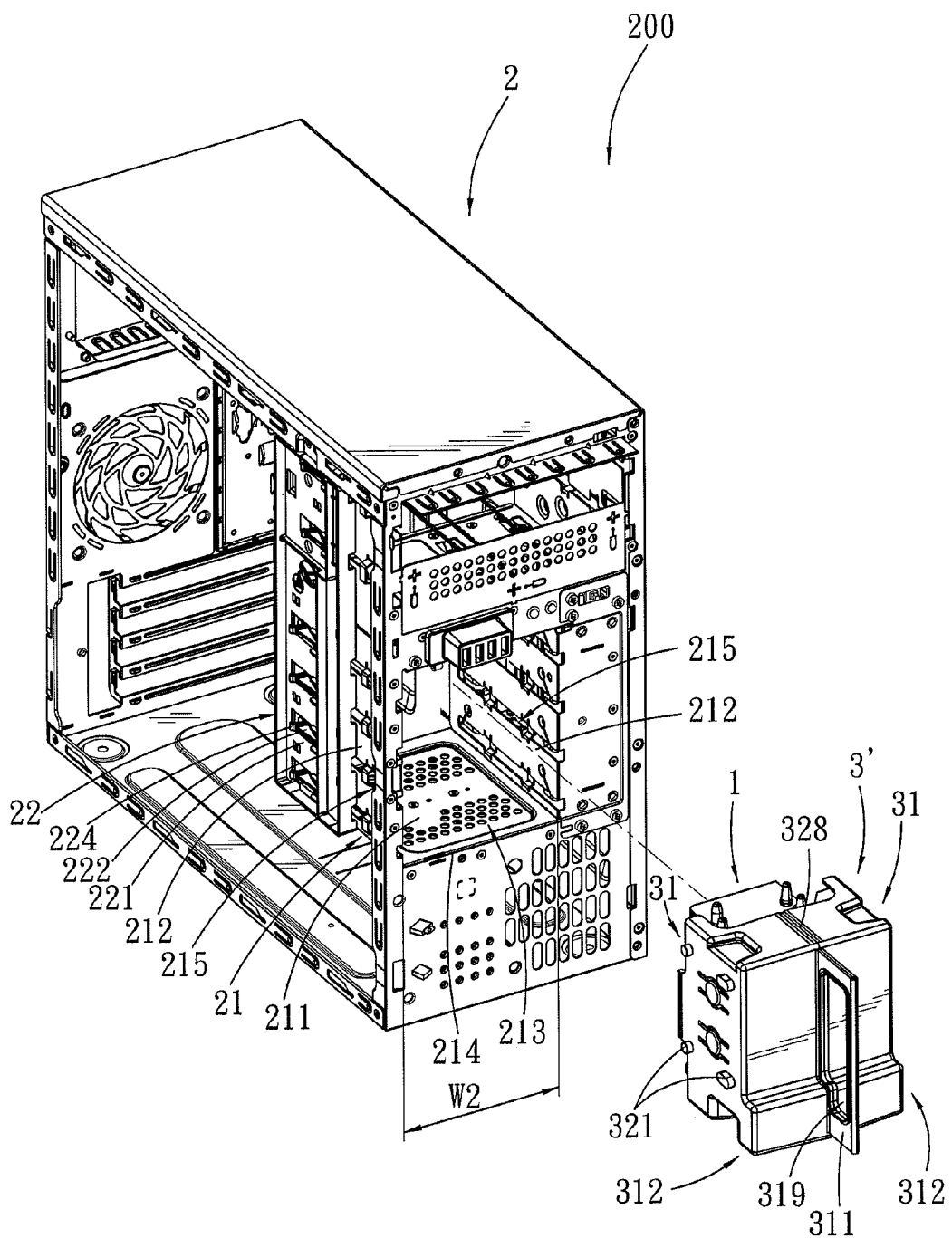
FIG. 14 is a partial exploded perspective view of an assembly according to the second embodiment of the present invention.
Figure 15:
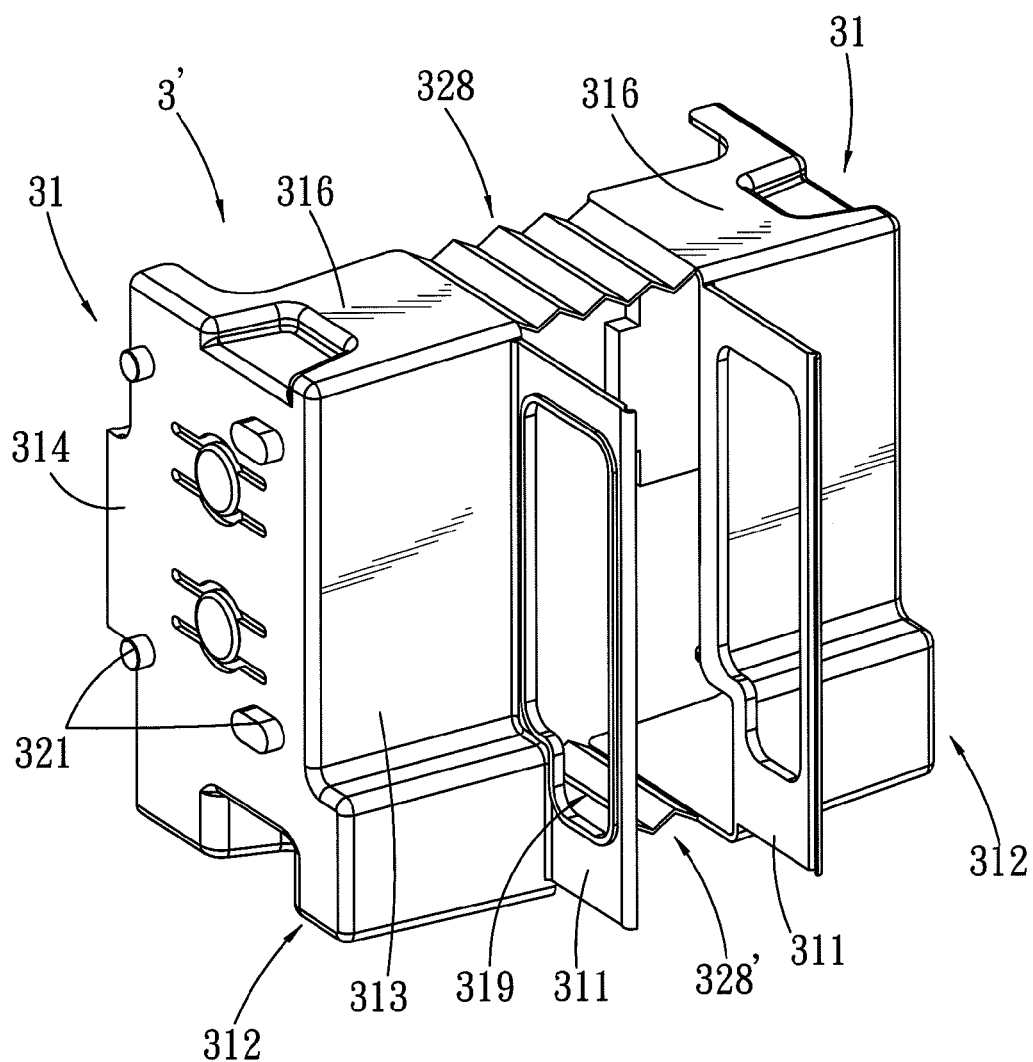
FIG. 15 is a perspective view of a package of the second embodiment.
Figure 16:
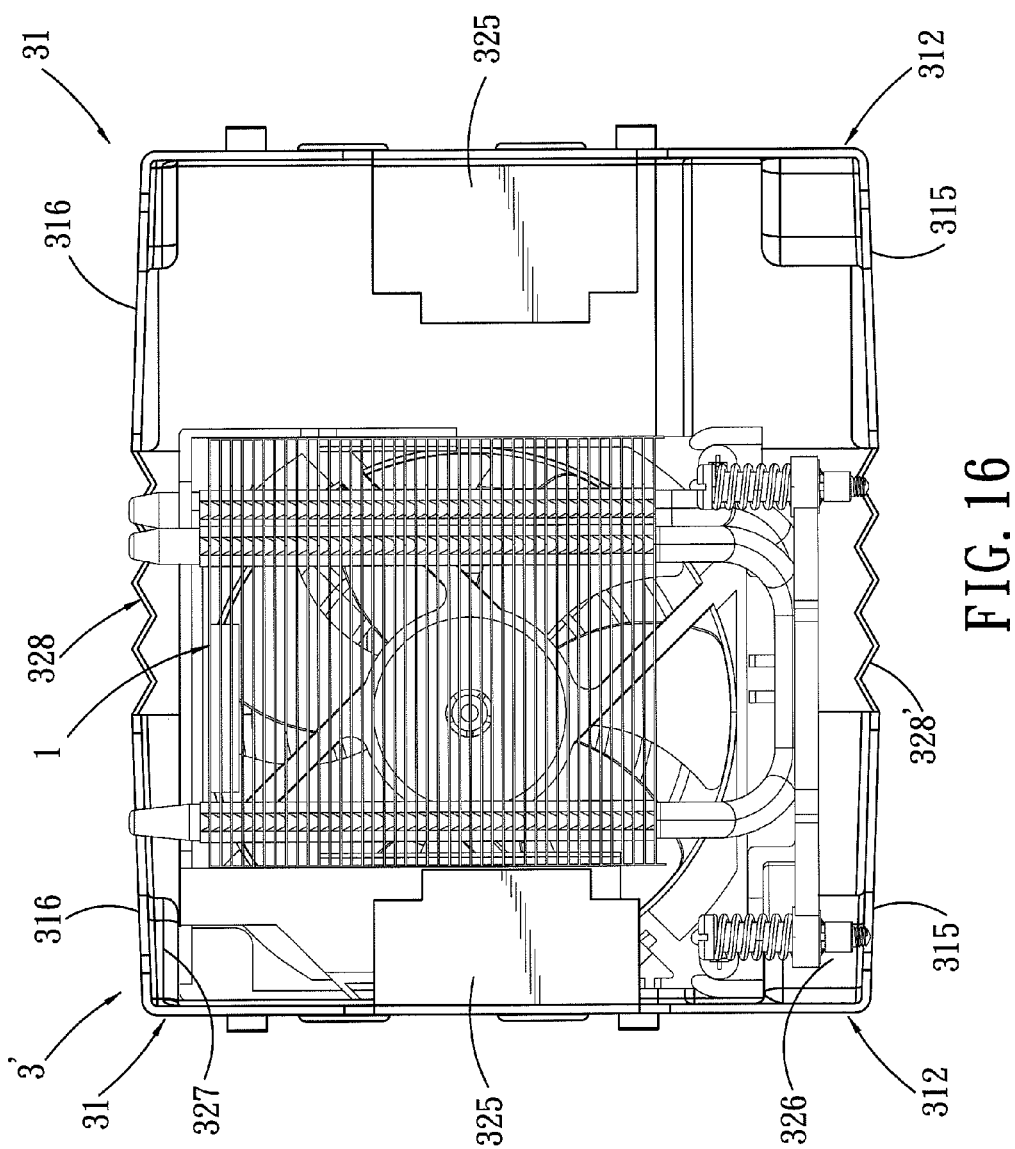
FIG. 16 is a schematic rear view, illustrating the article being mounted on one of two cover parts of the package.
Figure 17:
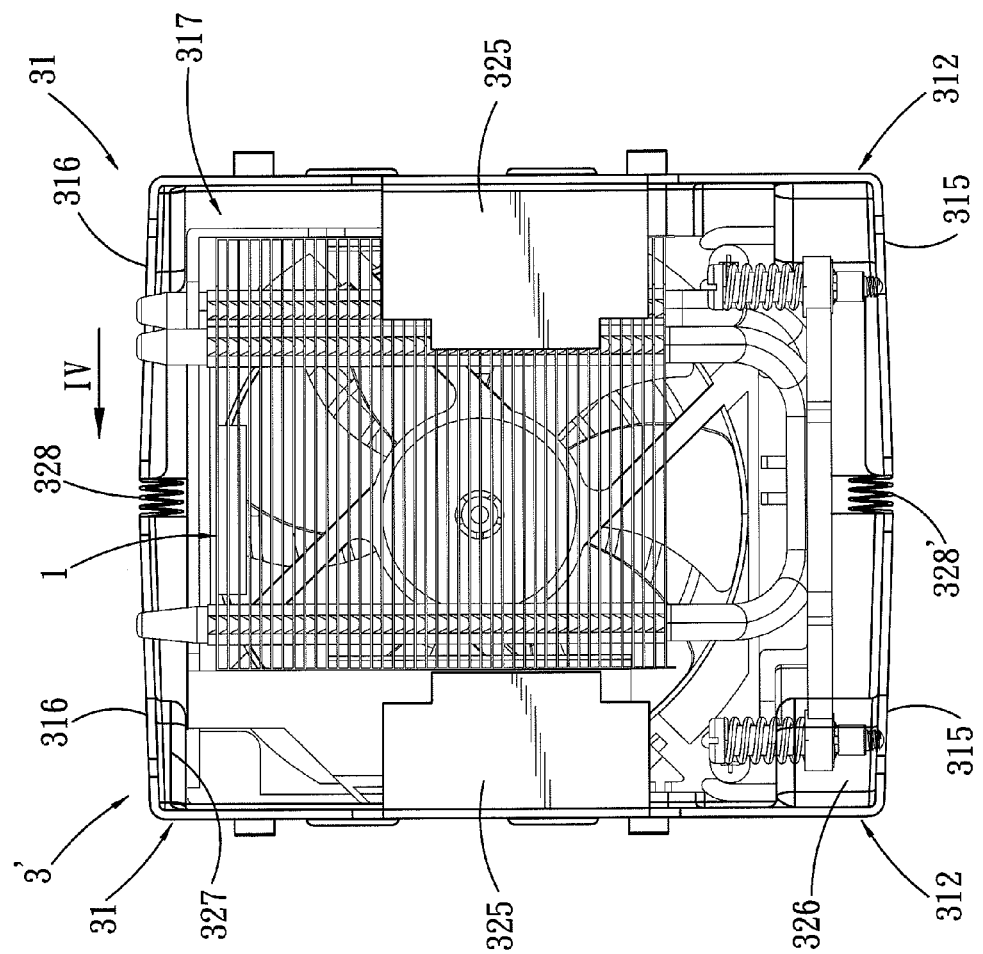
FIG. 17 is a view similar to FIG. 16, but illustrating the cover parts of the package retaining therebetween the article.

With reference to FIGS. 10 and 12, to remove the package 3 from the accommodating space 213, the lever portions 224 of the positioning members 222 are first pulled to move the retaining portions 223 away from the respective rear slide projections 321 of the left cover part 31, after which the user pulls the package 3 forwardly along a direction opposite to the arrow (III) using the handgrip 320 to remove the package 3 from the accommodating space 213 via the front opening 214. With reference to FIG. 13, to remove the article 1 from the package 3, the user pulls the spring plates 322 of the package 3 so as to separate the engaging grooves 323 from the respective engaging protrusions 324. Subsequently, the cover parts 31 are rotated from the cover position shown in FIG. 13 to the open position shown in FIG. 6, so that the article 1 can be removed from the package 3. Hence, through the configuration of the cover parts 31 of the package 3 which are rotatable between the cover and open positions, the article 1 can be easily covered by and removed from the package 3.

It should be noted that, although the positioning members 222 of the quick release mechanism 22 are used to retain the rear slide projections 321 of the left cover part 31 in this embodiment so as to position the package 3 within the accommodating space 213 of the mounting frame 21, in an alternative embodiment, the positioning members 222 may be formed as curved grooves formed in an inner face of one of the left and right sidewalls 212, and the second side plate 314 of one of the cover parts 31 may be formed with curved protrusions on an outer face thereof for engaging the respective curved grooves. In another alternative embodiment, the positioning members 222 may be configured as screws extending through one of the left and right sidewalls 212, and the second side plate 314 of one of the cover parts 31 may be formed with screw holes on an outer face thereof to receive threadedly and respectively the screws. Through such connections, the package 3 can be effectively secured within the accommodating space 213.

The design concept disclosed in the method for packaging the article 1 using the aforesaid package 3 of the present invention resides in that through the accommodating space 213 in the mounting frame 21 of the computer housing 2 to receive a hard disk or an optical disk, and through the mounting and positioning of the package 3 with the retained article 1 within the accommodating space 213, the volume of the entire computer housing 2 is not affected, and the computer housing 2 with the article 1 can be packed in a packing carton (not shown) and delivered to a customer (for example, a system assembly factory or a marketing company) for subsequent system assembly or sale directly to retail consumers. Hence, the packaging cost for packaging a single article 1 and the transport cost for transporting the same can be minimized.

When the computer housing 2 with the article 1 are delivered to the customer, the customer can remove the package 3 with the retained article 1 from the accommodating space 213 in the computer housing 2, after which the two cover parts 31 are disengaged and rotated to the open position to remove the article 1 from the package 3. After the customer installs a motherboard and a central processing unit into the computer housing 2, the article 1 is fastened to the motherboard in a manner abutting against the central processing unit. Similarly, when a consumer buys the computer housing 2 with the article 1, a suitable motherboard and a central processing unit are first installed in the computer housing 2, after which the article 1 is assembled to the computer housing 2 using the aforesaid steps. Further, through the presence of the slide rails 215 and the quick release mechanism 22, the package 3 can be quickly assembled to or removed from the mounting frame 21. As a result, operation and use of the present invention are easy, so that assembly and disassembly time can be reduced to a minimum.

Figure 18:
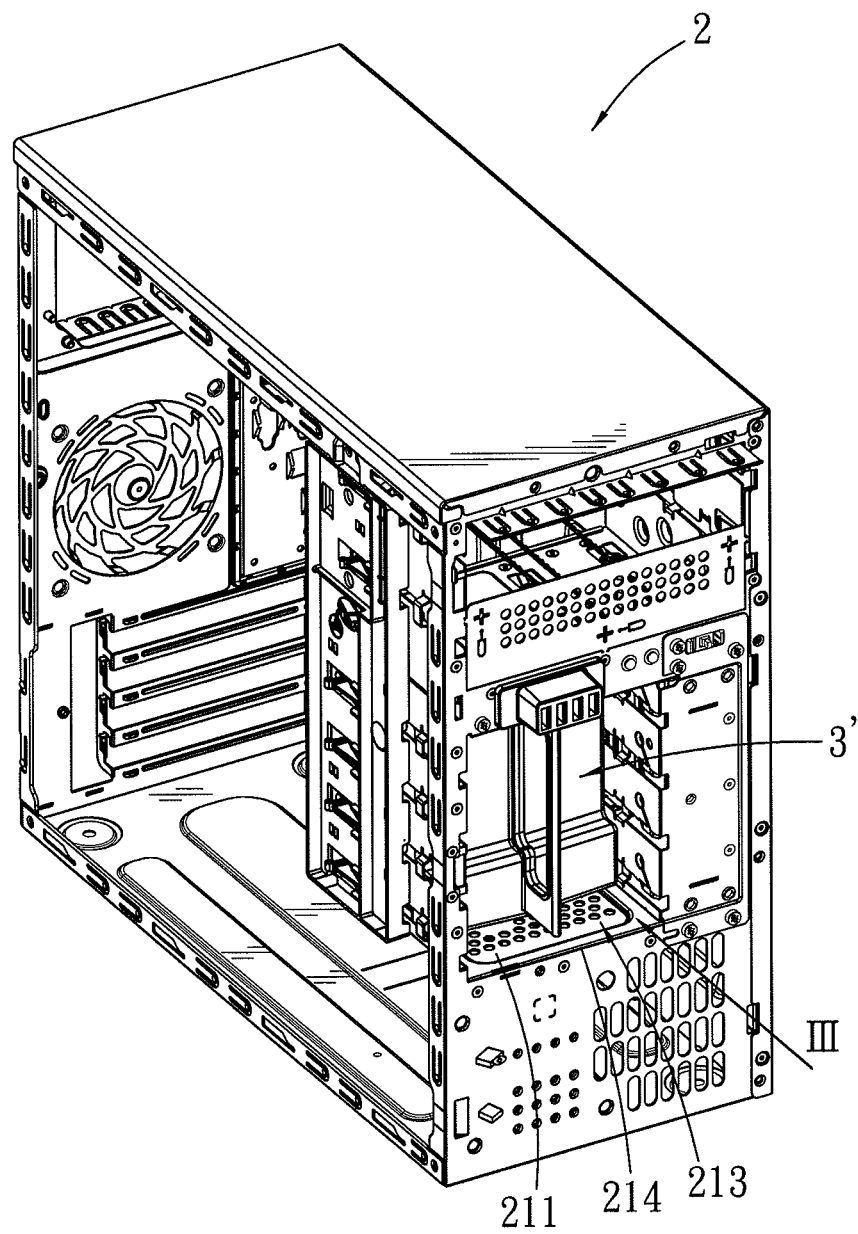
FIG. 18 is a perspective view of the second embodiment, illustrating the package with the retained article being disposed within the computer housing.

Referring to FIGS. 14 to 18, an assembly 200 according to the second embodiment of the present invention is shown to be similar to the first embodiment. The difference between the first and second embodiments resides in the configuration of the package 3'. In this embodiment, the package 3' further includes a compressible top corrugated plate 328 interconnecting the top plates 316 of the cover bodies 312 of the cover parts 31, and a compressible bottom corrugated plate 328' interconnecting the bottom plates 315 of the cover bodies 312 of the cover parts 31. Through such a configuration, the cover bodies 312 of the cover parts 31 are compressible to move close to each other or expandable to move away from each other, so that the size of the receiving space 317 and the communicating hole 318 can be adjusted. To use the package 3', the article 1 is first mounted on the cover body 312 of one of the cover parts 31, after which the other one of the cover parts 31 is pressed toward the cover part 31 with the mounted article 1 along the direction of an arrow (IV) so as to cooperatively cover and hold the article 1. With reference to FIG. 18, finally, the package 3' is aligned with the front opening 214 in the computer housing 2, and is inserted into the accommodating space 213 via the front opening 214. Hence, the package 3' along with the article 1 are similarly positioned within the accommodating space 213 of the computer housing 2.

Figure 19:
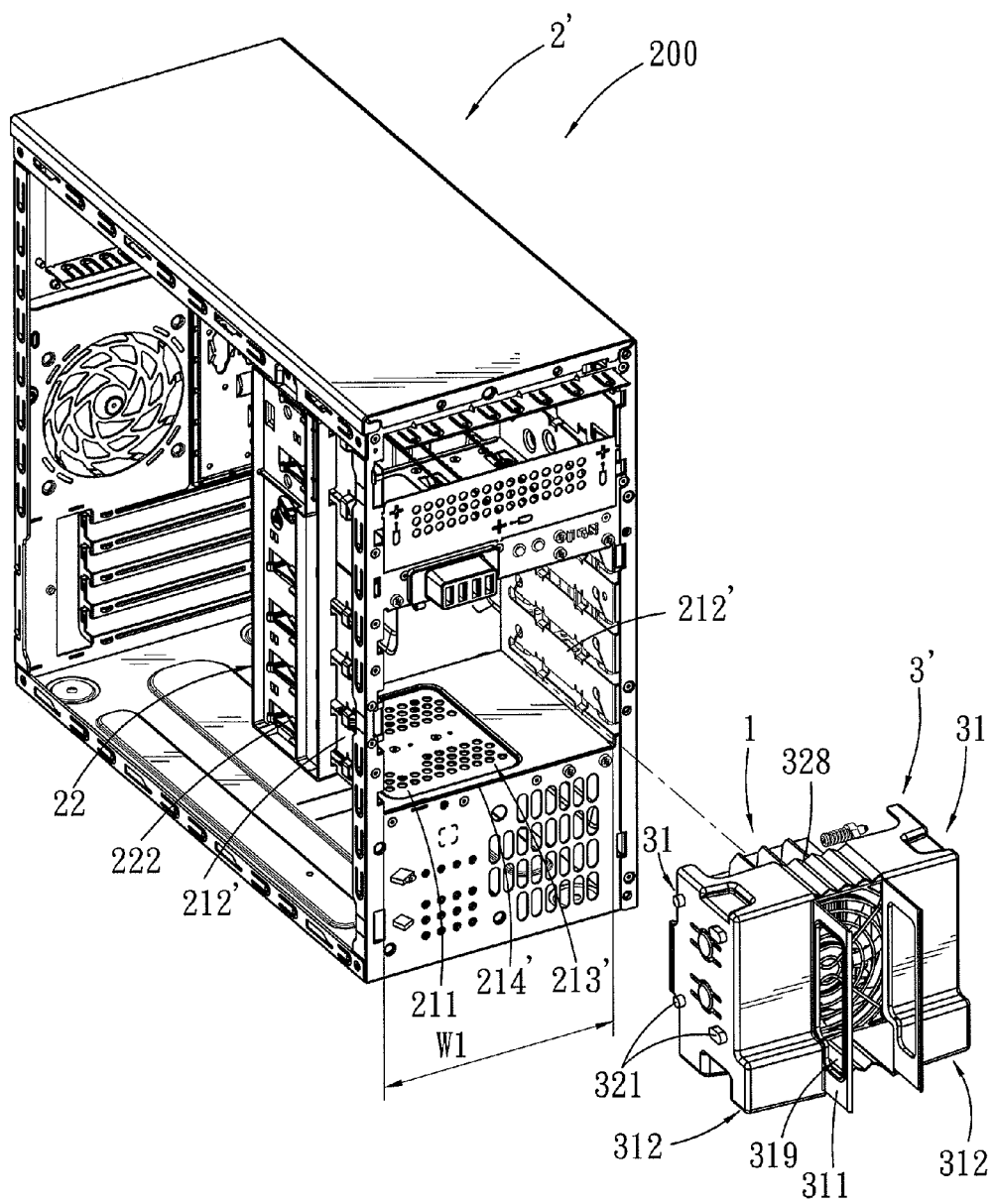
FIG. 19 is a partial exploded perspective view of an alternative form of the assembly of the second embodiment.
Figure 20:
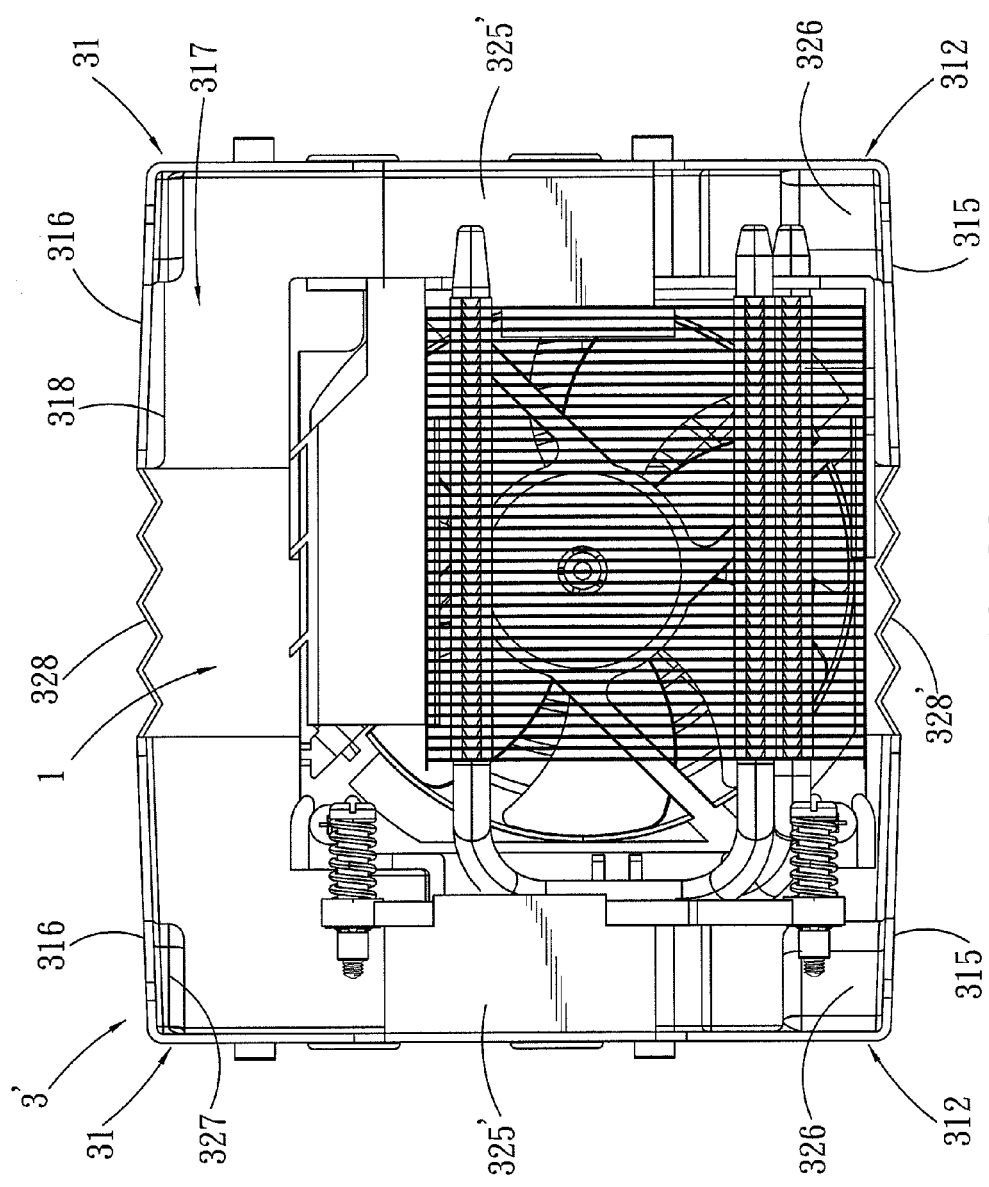
FIG. 20 is a schematic rear view of the package with the retained article of the alternative form of the second embodiment, illustrating the article being disposed horizontally between the cover parts of the package.
Figure 21:
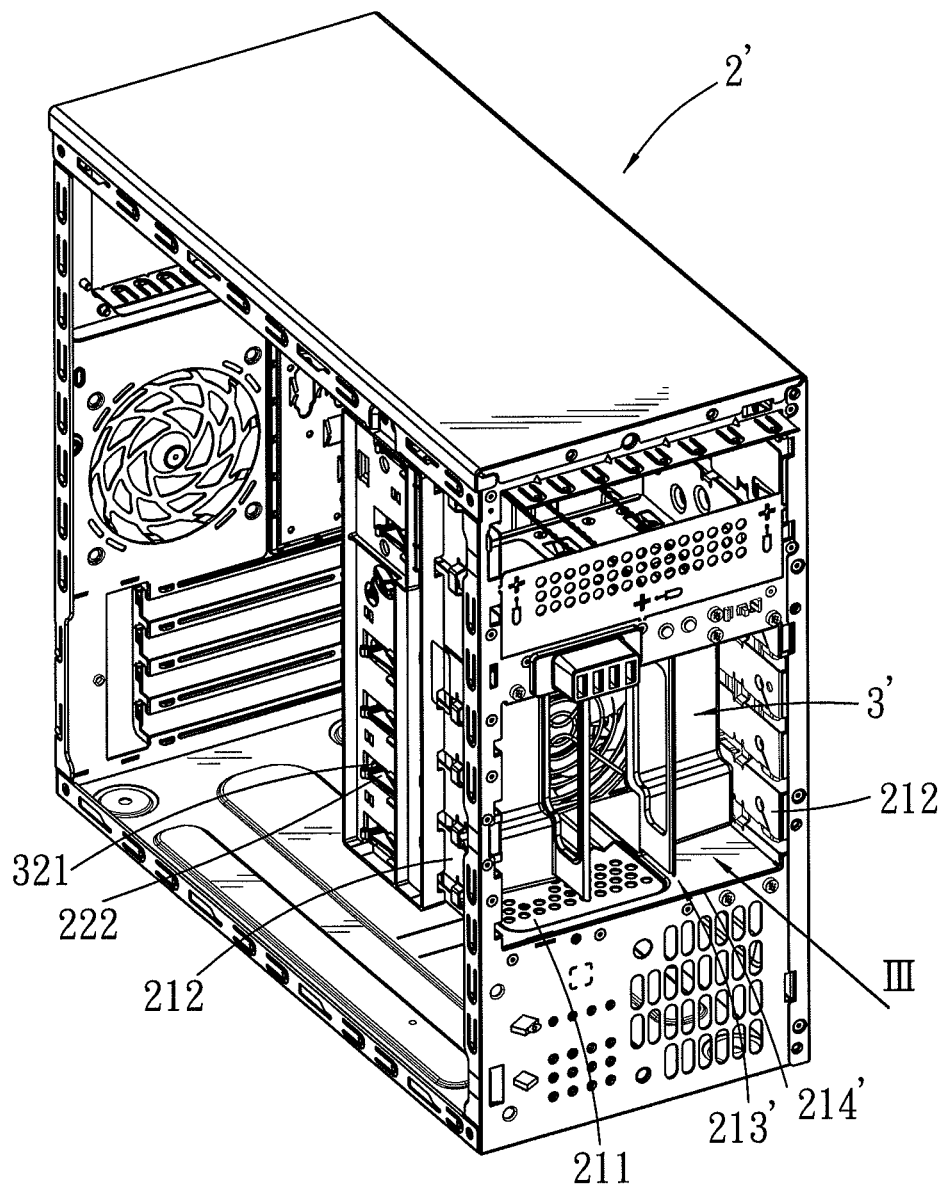
FIG. 21 is a perspective view of the alternative form of the second embodiment, illustrating the package with the retained article being disposed within the computer housing.

With reference to FIGS. 19 to 21, since the cover parts 31 of the package 3' are compressible and expandable to be movable close to or away from each other, the package 3' may be installed in the accommodating space 213' of the computer housing 2' shown in FIG. 19. The left and right sidewalls 212' of the computer housing 2' are spaced apart from each other at a distance (W1) which is larger than a distance (W2) (see FIG. 14) between the left and right sidewalls 212 of the computer housing 2. The article 1, as shown in FIG. 20, is retained horizontally between the cover parts 31' through the stop members 325'. The package 3' is similarly aligned with the front opening 214' in the computer housing 2', and is inserted into the accommodating space 213' via the front opening 214' along the direction of the arrow (III) (see FIG. 21). Hence, the package 3' along with the article 1 are positioned within the accommodating space 213'. Since the cover parts 31 of the package 3' are compressibly and expandably movable close to or away from each other, the package 3' can receive and cover different sizes of the article 1, or the article 1 can be placed within the cover parts 31' in different directions, that is, vertically or horizontally. Further, the package 3' can be installed in the accommodating space 213' of the computer housing 2' having different dimensions. Hence, use of the package 3' is flexible.

From the aforesaid description, each of the embodiments make use of the package 3, 3' to pack the article 1 and install the same within the accommodating space 213, 213' of the computer housing 2, 2', so that the article 1 can be delivered or sold along with the computer housing 2, 2'. As such, costs associated with individual packaging and delivery of the article 1 can be reduced. Hence, the objects of the present invention can be realized.

While the present invention has been described in connection with what are considered the most practical embodiments, it is understood that this invention is not limited to the disclosed embodiments but is intended to cover various arrangements included within the spirit and scope of the broadest interpretations and equivalent arrangements.

We claim:

1. An assembly comprising:
an article;
a computer housing including left and right sidewalls, and a positioning member provided on one of said left and right sidewalls, said left and right sidewalls cooperatively defining an accommodating space, and an opening for communicating said accommodating space with an external environment, each of said left and right sidewalls including a slide rail extending in a front-rear direction; and
a package mounted removably in said accommodating space via said opening, said package being connected slidably to said slide rails of said left and right sidewalls, being positioned within said accommodating space through said positioning member, and including two interconnected cover parts cooperatively defining a receiving space and a communicating hole for communicating said receiving space with the external environment, said article being disposed in said receiving space, said package further including a handgrip disposed on a front end thereof to mount removably said package in said accommodating space, each of said cover parts including a stop member adjacent to said communicating hole and abutting against said article to prevent escape of said article from said receiving space via said communicating hole.

2. The assembly of claim 1, wherein each of said cover parts further includes a cover body having a slide projection, said slide projections of said cover parts being connected slidably and respectively to said slide rails of said sidewalls, said cover bodies of said cover parts cooperatively defining said receiving space and said communicating hole.

3. The assembly of claim 2, wherein each of said cover parts further includes a connecting plate provided on a front side of said cover body and having a through hole (319), said through holes in said connecting plates of said cover parts corresponding in position to each other, said connecting plates of said cover parts cooperatively forming said handgrip.

4. The assembly of claim 3, wherein said cover parts are made integrally as a one-piece body, and said connecting plates of said cover parts are connected to each other in a left-right direction, said cover parts being rotatable between an open position, where said cover parts are moved away from each other, and a cover position, where said cover parts are moved close to each other.

5. The assembly of claim 4, wherein said cover body of one of said cover parts is provided with an engaging groove, and said cover body of the other one of said cover parts is provided with an engaging protrusion that is engageable with said engaging groove to position said cover parts in said cover position.

6. The assembly of claim 5, wherein said cover body of one of said cover parts is provided with a flexible member having said engaging groove, said flexible member being pulled to disengage said engaging groove from said engaging protrusion.

7. The assembly of claim 3, wherein said cover parts are made integrally as a one-piece body, said package further including a compressible top corrugated plate interconnecting top ends of said cover bodies of said cover parts, and a compressible bottom corrugated plate interconnecting bottom ends of said cover bodies of said cover parts, said cover bodies of said cover parts being compressible and expandable to adjust the size of said receiving space and said communicating hole.

8. The assembly of claim 2, wherein said positioning member is configured as a flexible arm that is pressed releasably against said slide projection.

9. The assembly of claim 2, wherein said cover body of each of said cover parts further includes a lower abutment portion projecting from a bottom end of an inner face thereof and abutting against a bottom end of said article, and an upper abutment portion projecting from a top end of said inner face thereof and abutting against a top end of said article.

10. The assembly of claim 1, wherein said article is configured as a heat sink.

11. A package for packaging an article, said package along with the article being mounted removably in an accommodating space defined by left and right sidewalls of a computer housing, said package comprising:

two interconnected cover parts cooperatively defining a receiving space for receiving the article, a communicating hole for communicating said receiving space with an external environment, and a handgrip to allow for gripping of said package, each of said cover parts including a stop member adjacent to said communicating hole and abutting against said article for preventing escape of the article from said receiving space via said communicating hole.

12. The package of claim 11, wherein said cover parts are made integrally as a one-piece body, and are connected to each other in a left-right direction, said cover parts being rotatable between an open position, where said cover parts are moved away from each other, and a cover position, where said cover parts are moved close to each other.

13. The package of claim 11, wherein said cover parts are made integrally as a one-piece body, said package further including a compressible top corrugated plate interconnecting top ends of said cover parts, and a compressible bottom corrugated plate interconnecting bottom ends of said cover parts, said cover parts being compressible and expandable to adjust the size of said receiving space and said communicating hole.

14. The package of claim 11, wherein each of said cover parts further includes a cover body having a slide projection, said cover bodies of said cover parts cooperatively defining said receiving space and said communicating hole.

15. The package of claim 14, wherein each of said cover parts further includes a connecting plate provided on a front side of said cover body and having a through hole, said through holes in said connecting plates of said cover parts corresponding in position to each other, said connecting plates of said cover parts cooperatively forming said handgrip.

16. The package of claim 15, wherein said cover parts are made integrally as a one-piece body, and are connected to each other in a left-right direction, said cover parts being rotatable between an open position, where said cover parts are moved away from each other, and a cover position, where said cover parts are moved close to each other.

17. The package of claim 16, wherein said cover body of one of said cover parts is provided with an engaging groove, and said cover body of the other one of said cover parts is provided with an engaging protrusion that is engageable with said engaging groove to position said cover parts in said cover position, said cover body of one of said cover parts being provided with a flexible member defining said engaging groove, said flexible member being pulled to disengage said engaging groove from said engaging protrusion.

18. The package of claim 15, wherein said cover parts are made integrally as a one-piece body, said package further including a compressible top corrugated plate interconnecting top ends of said cover parts, and a compressible bottom corrugated plate interconnecting bottom ends of said cover parts, said cover parts being compressible and expandable to adjust the size of said receiving space and said communicating hole.

19. The package of claim 14, wherein said cover body of each of said cover parts further includes a lower abutment portion projecting from a bottom end of an inner face thereof and adapted to abut against a bottom end of the article, and an upper abutment portion projecting from a top end of said inner face thereof and adapted to abut against a top end of the article.

* * * * *